(12) United States Patent
Li et al.

(10) Patent No.: US 10,769,001 B2
(45) Date of Patent: Sep. 8, 2020

(54) SYSTEM AND METHOD FOR PROCESS STATE PROCESSING

(71) Applicant: DiDi Research America, LLC, Mountain View, CA (US)

(72) Inventors: Dong Li, Santa Clara, CA (US); Huaiyu Zhu, Newark, CA (US); Jing Chen, Palo Alto, CA (US); Michael Lin, Milpitas, CA (US); Shray Kapoor, Fremont, CA (US); Yichong Lin, Saratoga, CA (US)

(73) Assignee: DiDi Research America, LLC, Mountain View, CA (US)

( * ) Notice: Subject to any disclaimer, the term of this patent is extended or adjusted under 35 U.S.C. 154(b) by 44 days.

(21) Appl. No.: 15/927,516

(22) Filed: Mar. 21, 2018

(65) Prior Publication Data

US 2019/0294482 A1    Sep. 26, 2019

Related U.S. Application Data

(63) Continuation of application No. 15/927,104, filed on Mar. 21, 2018.

(51) Int. Cl.
*H04L 9/06* (2006.01)
*G06F 9/54* (2006.01)
*G06F 12/02* (2006.01)
*G06F 16/901* (2019.01)
*G06F 16/951* (2019.01)

(52) U.S. Cl.
CPC .............. *G06F 9/542* (2013.01); *G06F 9/544* (2013.01); *G06F 9/545* (2013.01); *G06F 9/546* (2013.01); *G06F 12/0253* (2013.01); *G06F 16/9024* (2019.01); *G06F 16/951* (2019.01); *G06F 9/54* (2013.01); *G06F 2209/548* (2013.01)

(58) Field of Classification Search
CPC .... G06F 9/542; G06F 16/951; G06F 16/9024; G06F 9/544; G06F 9/546; G06F 9/54; G06F 2209/548
See application file for complete search history.

(56) References Cited

U.S. PATENT DOCUMENTS

2004/0193637 A1* 9/2004 Westendorf ............ G06Q 10/10
2013/0152207 A1* 6/2013 Cui .......................... G06F 21/53
726/26

(Continued)

OTHER PUBLICATIONS

Final Office Action dated Jul. 26, 2019, issued in related U.S. Appl. No. 15/927,104 (16 pages).

(Continued)

*Primary Examiner* — Doon Y Chow
*Assistant Examiner* — Abdou K Seye
(74) *Attorney, Agent, or Firm* — Sheppard Mullin Richter & Hampton LLP (57) ABSTRACT

Process states of computing devices may be obtained and processed. Process event information of a computing device may be obtained. The process event information may characterize states of processes of the computing device. The process event information may be stored within a queue. Graph information may be determined based on the process event information within the queue. The graph information may characterize states of processes of the computing device using nodes and edges. The graph information may be stored within a graph database.

22 Claims, 6 Drawing Sheets

(56) References Cited

U.S. PATENT DOCUMENTS

| | | |
|---|---|---|
| 2014/0280162 A1 | 9/2014 | Halpern |
| 2015/0293764 A1* | 10/2015 | Visvanathan ............. G06F 8/36 |
| | | 717/102 |
| 2015/0356301 A1* | 12/2015 | Diehl .................... G06F 21/577 |
| | | 726/22 |
| 2017/0075746 A1* | 3/2017 | Nomura ............. G06F 11/3476 |
| 2017/0180509 A1* | 6/2017 | Dhawan ............. H04L 41/0631 |
| 2019/0294481 A1 | 9/2019 | Li et al. |

OTHER PUBLICATIONS

Non-Final Office Action dated Mar. 8, 2019, issued in related U.S. Appl. No. 15/927,104 (12 pages).

* cited by examiner

SYSTEM AND METHOD FOR PROCESS STATE PROCESSING

CROSS-REFERENCE TO RELATED APPLICATIONS

This application is a continuation application of U.S. Non-Provisional patent application Ser. No. 15/927,104, filed Mar. 21, 2018, and entitled "ENDPOINT PROCESS STATE COLLECTOR." The entirety of the aforementioned application is incorporated herein by reference.

TECHNICAL FIELD

The disclosure relates generally to collecting and processing process states of computing devices.

BACKGROUND

Information about states of processes running on a computing device may provide information about operations of the computing device. For example, information about state changes of processes may provide information regarding changes in operations of the computing device. It is desirable to provide comprehensive tracking of states of processes running on computing devices.

SUMMARY

One aspect of the present disclosure is directed to a method for processing process states. The method may comprise: obtaining process event information of a computing device, the process event information characterizing states of processes of the computing device; storing the process event information within a queue; determining graph information based on the process event information within the queue, the graph information characterizing states of processes of the computing device using nodes and edges; and storing the graph information within a graph database.

Another aspect of the present disclosure is directed to a system for processing process states. The system may comprise one or more processors and a memory storing instructions. The instructions, when executed by the one or more processors, may cause the system to perform: obtaining process event information of a computing device, the process event information characterizing states of processes of the computing device; storing the process event information within a queue; determining graph information based on the process event information within the queue, the graph information characterizing states of processes of the computing device using nodes and edges; and storing the graph information within a graph database.

In some embodiments, the process event information may be obtained from a process state collector agent running on the computing device.

In some embodiments, the process event information may be obtained and stored within the queue by an event receiver server of the system.

In some embodiments, the queue may be a distributed buffer storage.

In some embodiments, the graph information may be determined by a stream processor of the system and the stream processor may be, to determine the graph information, configured to identify and order process events based on the process event information within the queue.

In some embodiments, the stream processor may use process event information obtained at different times to identity missing process start events or missing process termination events.

In some embodiments, the graph information may include parent-child relationships and properties of the processes of the computing device.

In some embodiments, the graph information may be stored within the graph database using a key-value database structure.

In some embodiments, a query regarding a given process of the computing device may be obtained. A response to the query may be determined based on the graph information within the graph database. The query may be obtained and responded to by a query server of the system.

In some embodiments, the query server may provide a set of application programming interfaces to obtain and respond to the query. The set of application programming interfaces may include a single-call application programming interface, an iterative application programming interface, and a batch-processing application programming interface.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Figure 1:
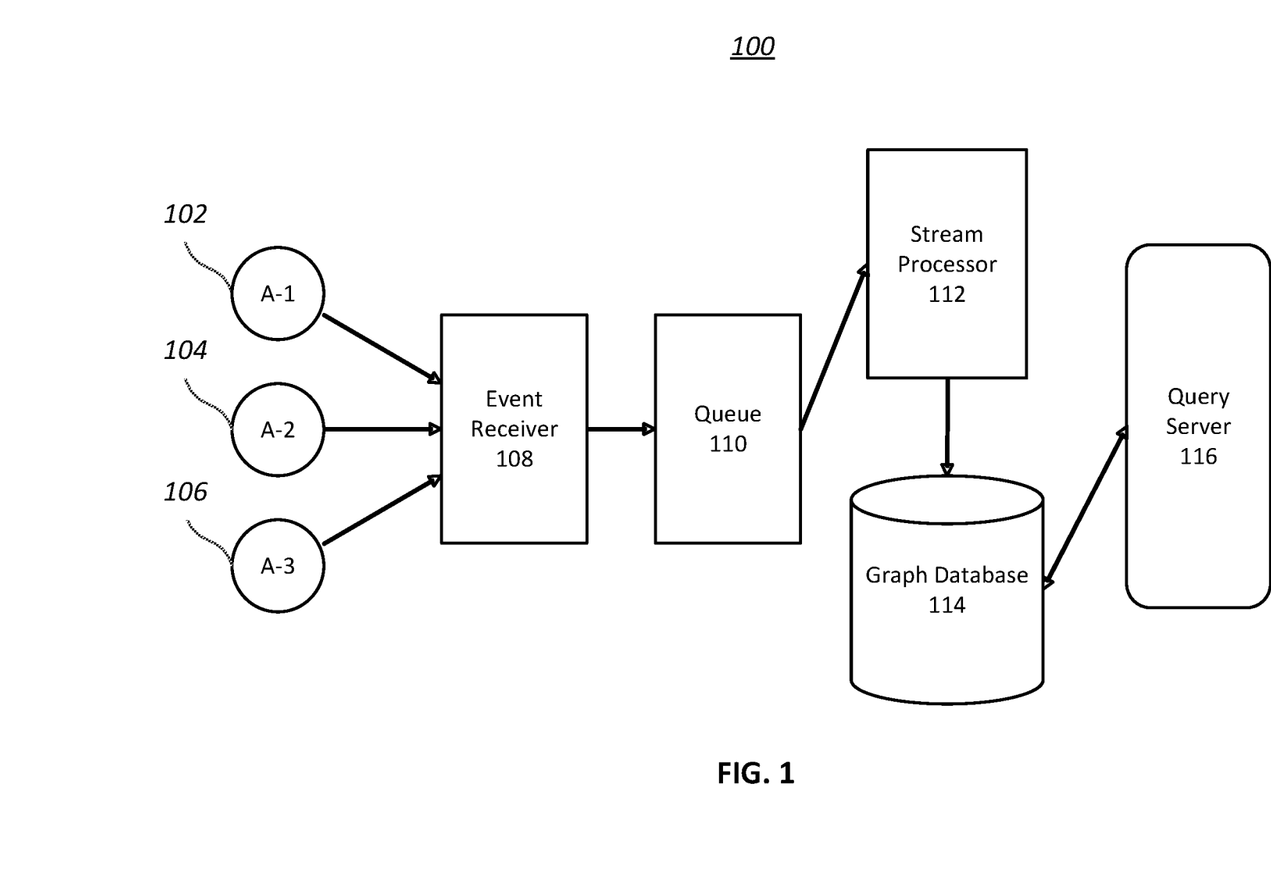
FIG. 1 illustrates an example environment for collecting and processing process states, in accordance with various embodiments of the disclosure.

FIG. 1 illustrates an example environment 100 for collecting and processing process states, in accordance with various embodiments. The example environment may include agents 102, 104, 106, an event receiver 108, a queue 110, a stream processor 112, a graph database 114, and a query server 116. One or more of the individual components shown in the environment 100 may include, have access to, and/or be associated with one or more processors and memory. The processor(s) may be configured to perform various operations by interpreting machine-readable instructions stored in the memory. For example, the agents 102, 104, 106 may represent individual software agents running on individual computing devices, such as desktop, laptop, smartphone, tablet, mobile devices, and/or other electronic devices/systems. One or more of such computing devices may be endpoints within a network. One or more of the event receiver 108, the stream processors 112, and/or the query server 116 may be located within one or more computing devices within the network, such as one or more servers within the network. Other numbers of agents, structures, and distribution of components of the environment 100 within one or more computing devices are contemplated.

The agents 102, 104, 106 may observe and record information relating to processes, such as process events, running on the individual computing devices. The agents 102, 104, 106 may track some or all processes running on the computing devices. The agents 102, 104, 106 may track specific processes running on the computing devices. The agents 102, 104, 106 may collect and provide information relating to processes running on the individual computing devices to other components within the environment 100.

For example, the agents 102, 104, 106 may be running on endpoints within a network to collect and provide information relating to process states of the endpoints to other computing device(s) within the network. The agents 102, 104, 106 may be referred to as endpoint process state collectors. The computing device(s) (e.g., server(s), one or more of the event receiver 108, the stream processors 112, and/or the query server 116) that receive and/or use the information relating to process states from the endpoint process state collectors may be referred to as a dynamic process graph interpreter. The dynamic process graph interpreter may interpret process events on the endpoints to generate and maintain process graphs of the endpoints. Such a process graph may be referred to as an endpoint process graph. An endpoint process graph may define lineage/inheritance information (e.g., parent-child relationship) for processes running on an endpoint.

The agents 102, 104, 106 may act with a certain degree of autonomy to collect and provide information relating to processes running on the computing devices. The agents 102, 104, 106 may be autonomous and/or work with other software agents/programs. The agents 102, 104, 106 may not require any interaction of users of computing devices on which the agents 102, 104, 106 reside to perform their functions. The agents 102, 104, 106 may invoke one or more tasks on the computing devices to collect and provide information relating to processes running on the computing devices.

For example, the agent A-1 102 may collect information relating to parent-child relationships of processes running on the computing device on which the agent A-1 102 resides and provide the collected information directly/indirectly to the event receiver 108. The agent A-2 104 may collect information relating to parent-child relationships of processes running on the computing device on which the agent A-2 104 resides and provide the collected information to the event receiver 108. The agent A-3 106 may collect information relating to parent-child relationships of processes running on the computing device on which the agent A-3 106 resides and provide the collected information to the event receiver 108.

Having access to lineage/inheritance relationships of processes may be important to understanding the functions of the processes and the computing devices. For example, an investigation into a given process running on a computing device (e.g., for security, antivirus analysis, intrusion detection, device monitoring purposes) may require knowledge about which process(es) directly/indirectly created the given process, when the given process was created, what tasks the given process performed, and/or what process(es) the given process created. However, an operating system of the computing device may not keep track of lineage/inheritance relationship of processes and lineage/inheritance relationship of processes may be lost. Additionally, identifiers of processes may be reused by an operating system. For example, a given identifier of a given process may be reused to identify another process after termination of the given process. Lack of lineage/inheritance relationships of processes may make it difficult and time-consuming to investigate functions of processes, especially after the processes/related processes have terminated. Additionally, if termination of a given process is not reported and another process reuses the identifier that was assigned to the given process, it may be difficult to determine that a different process is running on the computing device. Malicious programs may take advantage of such blind spots to infect computing devices.

The agents 102, 104, 106 may generate comprehensive lineage/inheritance information relating to processes running on the computing devices. The agents 102, 104, 106 may generate comprehensive lineage/inheritance information by determining process event information of the computing devices using multiple process event observation tools. The process event information may characterize states of processes of the computing devices. The process event information may include information on identifiers (PID), start times, parent-child relationships, and/or other information relating to processes running on the computing devices. Given that a particular identifier may be reused when the associated process terminates, a unique identifier of a given process may be determined based on the identifier and the start time of the given process. That is, a combination of the identifier and the start time of a given process may be used as a unique identifier for the given process. In some embodiments, the process event information may include information on one-way parent-child relationships. The process event information may include, for a given process, information identifying the parent(s) of the given process or the child(ren) of the given process. In some embodiments, the process event information may include information on two-way parent-child relationships. The process event information may include, for a given process, information identifying the parent(s) of the given process and the child(ren) of the given process.

The process event information may include metadata relating to processes. For example, for a given process, the process event information may include information on one or more of process properties, command line, path, process identifier (PID), process start time, process end time, parent process identifier (PPID), parent process start time, parent process end time, child process identifier (CPID), child process start time, child process end time, operations/tasks performed by the given process (e.g., creating/modifying/deleting file/line/property, opening/closing file, connecting to a device/network), reasons for process creation/termination (e.g., system initialization, execution of process creation system call by an existing process, user/system request to create a process, initialization of a batch job, halt instruction, user log-off, execution of a service request to terminate, error/fault conditions, normal completion, time limit exceed, memory unavailable, bounds violation, protection error, arithmetic error, time overrun, I/O failure, invalid instruction, privileged instruction, data misuse, OS intervention, parent process termination/cascading termination, parent request), and/or other information relating to the given process.

The agents 102, 104, 106 may provide the process event information and/or other information to the event receiver 108. The agents 102, 104, 106 may provide the process event information to the event receiver 108 based on process event information determination, at periodic intervals, based on a request for the process event information from the event receiver 108, and/or other information. Communication between the agents 102, 104, 106 and the event receiver 108 may be accomplished through one or more communication protocols, such as standard Internet protocols or other network communication protocols. In some embodiments, the agents 102, 104, 106 and the event receiver 108 may be geographically distributed and may be connected via one or more networks (e.g., internet, intranet, extranet).

In some embodiments, the process event information may include endpoint identifiers to identify the computing devices running the processes. In some embodiments, the endpoint identifiers of the process event information may be determined by the agents 102, 104, 106. In some embodiments, the endpoint identifiers of the process event information may be determined by the event receiver 108. For example, the event receiver 108 may attach/associate a particular endpoint identifier to process event information based on from which of the agents 102, 104, 106 the process event information was obtained.

The process event observation tools used by the agents 102, 104, 106 may include two or more of an observation of process creation events and process termination events, a garbage collection, a process scan, and/or other process event observation tools. The process event observation tools may use/include one or more sensors to monitor process states (e.g., process creation events, process termination events) on the computing devices. The sensors may take the form of audit logs, transaction logs, event logs, operating system application programming interfaces, device drivers, kernel modules, and/or other tools for observing process events.

An observation of process creation events and process termination events may include (e.g., real-time) detection of events for process creation and process termination. Such observation of process creation events and process termination events may include addition of a process to an active process list based on the observation of a process creation event for the process and removal of the given process from the active process list based on the observation of a process termination event for the given process. Such active process lists may be maintained by the agents 102, 104, 106 and/or other components of the environment 100. For example, the agent A-1 102 may add a process to an active process list maintained by the agent A-1 102 based on the agent A-1 102 observing a process creation event for the process on its computing device. When the agent A-1 102 observes a process termination event for the process, the process may be removed from the active process list. The agent A-1 102 may determine process event information for the process based on the observation of the process creation event and/or the process termination event. Parent-child relationships and/or other metadata may be stored for each process on the active process list. Other states of processes (e.g., zombie) may be tracked using observation of process events. The process event information determined based on the observation of process events may be provided by the agent A-1 102 to the event receiver 108 in a message (event message).

A garbage collection may include checking states of processes listed on an active process list to determine whether they are active and removal of processes determined to not be active from the active process list. For example, the agent A-1 102 may query its commuting device to determine whether individual processes on the active process list are still active and identify processes that are no longer active. As another example, the agent A-1 102 may query the operating system of its computing device for a list of active processes and compare the list obtained from the operating system to its active process list. The agent A-1 102 may remove those processes that are no longer active from its active process list and send the list of processes that are no longer active to the event receiver 108 in a message (event message). The agent A-1 102 may determine process event information for processes based on the garbage collection and provide the process event information to the event receiver 108 in a message (event message). The garbage collection may enable the agent A-1 102 to identify zombie processes for which process termination event was not observed via observation of process termination events. Garbage collection may require consumption of resources (e.g., processing, time, memory) that are orders of magnitude smaller than process scan.

A process scan may include scanning a computing device to identify processes that are active. The list of processes that are identified to be active may be guaranteed to be correct at a point in time. The list of processes that are identified to be active based on the process scan may be reconciled with the active process list. For example, the agent A-1 102 may scan its computing device/query its computing device to perform a scan to identify all active processes, add newly identified active processes to the active process list, and remove from the active process list processes that are not identified as being active by the process scan. The agent A-1 102 may send the list of active processes to the event receiver 108 as a special aggregated event. The agent A-1 102 may determine process event information for processes based on the process scan and provide the process event information to the event receiver 108 in a message (event message). Process scan may require greater consumption of resources than garbage collection. Process scan may require freezing execution of non-OS processes to create the snapshot of active processes.

The agents 102, 104, 106 may use a combination of observation, garbage collection, process scan, and/or other process event observation tools to track states of processes on the computing devices. This hybrid-approach for process state collection may provide for comprehensive tracking of states of processes running on computing devices for different operating systems. That is, this hybrid-approach may provide a single process tracking model that may be used for different operating systems.

Figure 2:
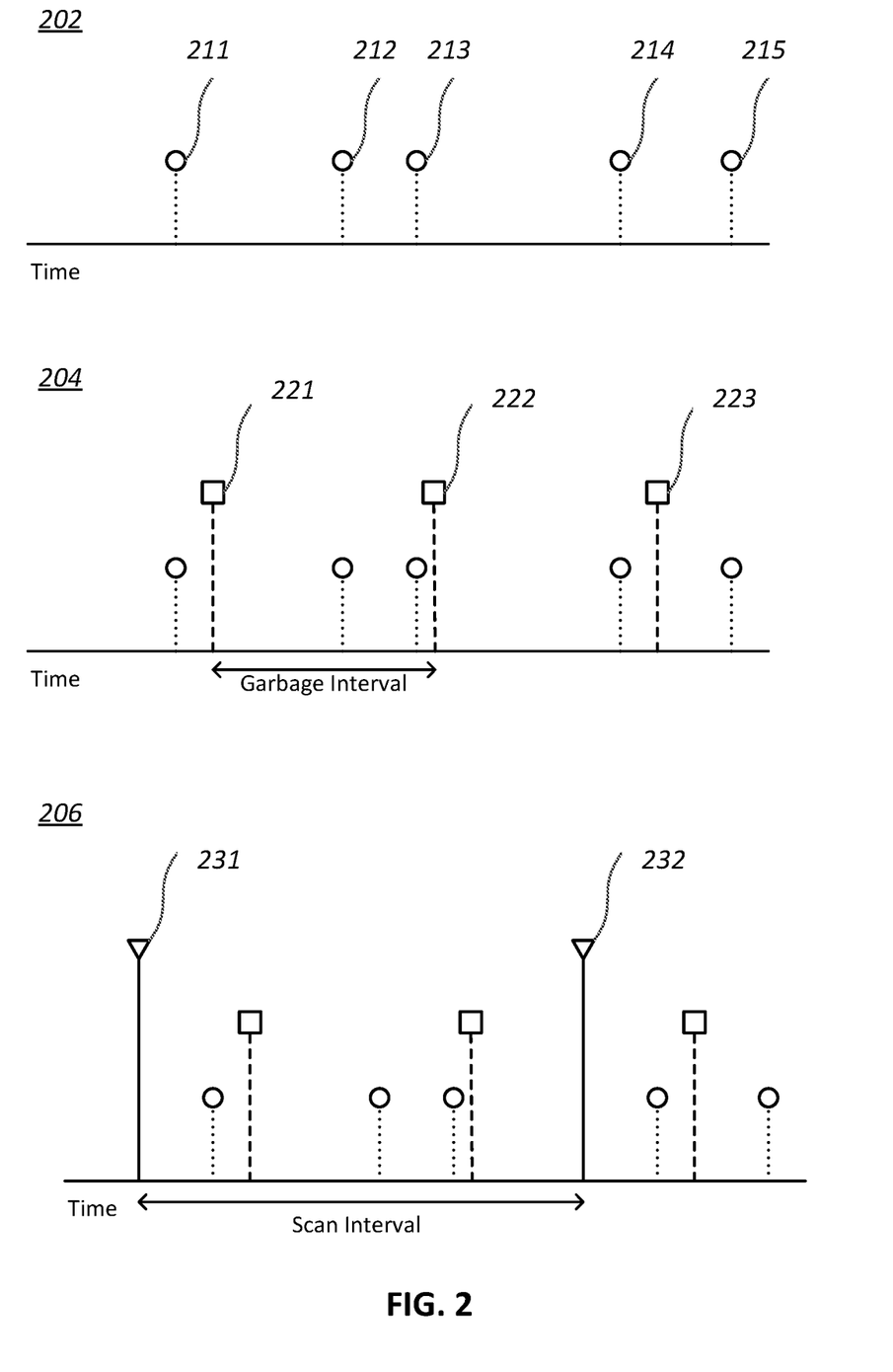
FIG. 2 illustrates example observations of process states, example garbage collections, and example process scans, in accordance with various embodiments of the disclosure.

FIG. 2 illustrates example observations of process states 202, example garbage collections 204, and example process scans 206, In the example 202, time occurrences of observations of process states, such as process creation events and/or process terminations events, may be shown by indicators 211, 212, 213, 214, 215. In some embodiments, the observations of process states may occur in real time (in response to observing the relevant process event). In the example 204, time occurrences of garbage collections may be shown by indicators 221, 222, 223. The garbage collections may occur periodically at a garbage interval (e.g., one minute). In the example 206, time occurrences of process scans may be shown by indicators 231, 232. The process scans may occur periodically at a scan interval (e.g., one hour). As shown in FIG. 2, garbage collections may occur periodically at a particular interval (garbage interval) and process scans may occur periodically at another time interval (scan interval), where the interval of the garbage collections is shorter than the interval of the process scans. Other intervals for garbage collections and process scans are contemplated.

In some embodiments, the agents 102, 104, 106 may determine the process events of the computing devices outside the kernel of the computing devices. For example, the agent A-1 102 may determine the process events of its computing device outside the kernel of its computing device. Operating outside the kernel of its computing devices may include tapping into facilities of process event observation tools provided by the operating systems of the respective computing devices. Operating outside the kernel may make it easier to deploy the agents 102, 104, 106 within the computing devices. For example, operating outside the kernel may allow the agents 102, 104, 106 to operate without special privileges, to operate without making changes to the kernel, and/or to operate without requiring installation of drivers. Using the facilities of process event observation tools (e.g., PCW, openBSM) provided by the operating systems may simplify the deployment and operation of the agents 102, 104, 106 within the computing devices.

Obtaining, storing, and processing process event information provided by the agents may require consumption of large amounts of resources (e.g., processing power, memory) in a short amount of time. Large number of concurrent events may need to be obtained, stored, and processed. For example, agents may be running on a large number of computing devices, which may result in large number of process events being collected and provided by the agents. There may be large bursts of process events at the computing devices, resulting in a large amount of process event information that needs to be handled in a timely manner. There may be network issues between the agents and the event receiver 108, resulting in process event information not being provided in a timely manner and a large flood of process event information being provided by the agents when network is restored. Due to network/processing delay, process event information for events may be provided by the agents out of order, and the events may have to be ordered properly. Information regarding the events may need to be used to identify process events/relationships quickly, which may require a sub-second level query on the events and their relationships. Agent failure (from process crash, hardware failure, network failure) may lead to loss of event information. Referring to FIG. 1, the event receiver 108, the queue 110, the stream processor 112, the graph database 114, and the query server 116 may provide resources for collecting and processing process events while addressing the above concerns.

The event receiver 108 may obtain process event information and/or other information of computing devices determined by the agents 102, 104, 106. The process event information may characterize states of processes of the computing devices on which the agents 102, 104, 106 reside. The event receiver 108 may include one or more processes and/or one or more servers within a network. For example, the event receiver 108 (e.g., event receiver server) may obtain process event information from a processor state collector agent running on a computing device (e.g., endpoint) within a network. The event receiver 108 may obtain process event information from the agents 102, 104, 106 and push the process event information into the queue 110.

The event receiver 108 may obtain the process event information directly from the agents 102, 104, 106 and/or through one or more intermediary devices (e.g., routers, modems, servers). The process event information may be pushed to the event receiver 108 by the agents 102, 104, 106 and/or pulled by the event receiver 108 from the agents 102, 104, 106.

The event receiver 108 may store the process event information within the queue 110. In some embodiments, the queue 110 may include an online server. In some embodiments, the queue 110 may include one or more distributed buffer storage. The queue 110 may utilize one or more stream processing platforms for handing real-time data feeds, such as Apache Kafka and/or other platforms. The queue 110 may include a scalable message queue to (1) prevent loss of process event information (enabling replay of events from the queue 110), (2) prevent congestion in the downstream processing, and (3) facilitate scaling up of data flow. Directly sending process event information obtained from the agents 102, 104, 106 to the stream processor 112 for processing may result in loss of information. That is, the stream processor 112 may not be able to timely process all information obtained by the event receiver 108 (the stream processor 112 may be a bottleneck) and the queue 110 may be used to buffer the information being provided to the stream processor 112. In some embodiments, the flow of information into and/or out of the queue 110 may be controlled by the stream processor 112 to prevent over-congestion at the stream processor 112. For instance, more processing power of the stream processor 112 may be available at certain times during the day (e.g., night time when less computing devices are being used) and more information may be pulled from the queue 110 to the stream processor 112 at those times to take advantage of available processing power. Using the queue 110 to control/manage the flow of process event information may be less costly than increasing processing power of the stream processor 112 because the cost of increasing memory is less than the cost of increasing processing power. In some embodiments, the queue 110 may not store process event information in the order in which the process event information was received because the order of the events may be determined by the stream processor 112.

The stream processor 112 may determine graph information based on the process event information within the queue 110 and/or other information. The graph information may characterize states of processes of the computing devices using nodes and edges. For example, individual processes may be represented by nodes within a graph and relationships between the processes may be represented by edges between the nodes. The stream processor 112 may interpret process events conveyed within the process event information and determine the process graph (e.g., endpoint process graph), defined by the graph information. The process graph may define parent-child relationships of processes running on a computing device/endpoint. The stream processor 112 may maintain process graphs of multiple computing devices/endpoints within the graph database 114.

The stream processor 112 may perform ETL (extract, transform, load) processes on the process event information to determine the graph information. For example, the stream processor 112 may extract relevant information relating to processes/process events from the process event information, transform one or more portions of information (e.g., from string values to integer values), and convert the information into a desired format (e.g., transform the information into a particular structure). The stream processor 112 may write process properties/metadata of processes together with the parent-child relationships into the graph information and push the graph information to the graph database 114. The stream processor 112 may be, to determine the graph information, configured to identify and order process events based on the process event information within the queue 110. The stream processor 112 may use one or more portions of the process event information and/or the graph information to trace the operations/states of processes and/or the changes in the processes and determine the orders in which the processes started/process events occurred.

The stream processor 112 may pull process event information from the queue 110 for processing based on time, based on available processing power, based on available process event information, and/or other information. For example, the stream processor 112 may follow a schedule to pull process event information at certain times. The stream processor 112 may pull process event information when it has processing power available to determine the graph information based on the process event information. The stream processor 112 may listen to the queue 110 and pull the process event information when the process event information is loaded into the queue 110. In some embodiments, the stream processor 1112 may be a distributed processor. That is, processing of the process event information may be distributed across multiple processors/computing devices.

Figure 3:
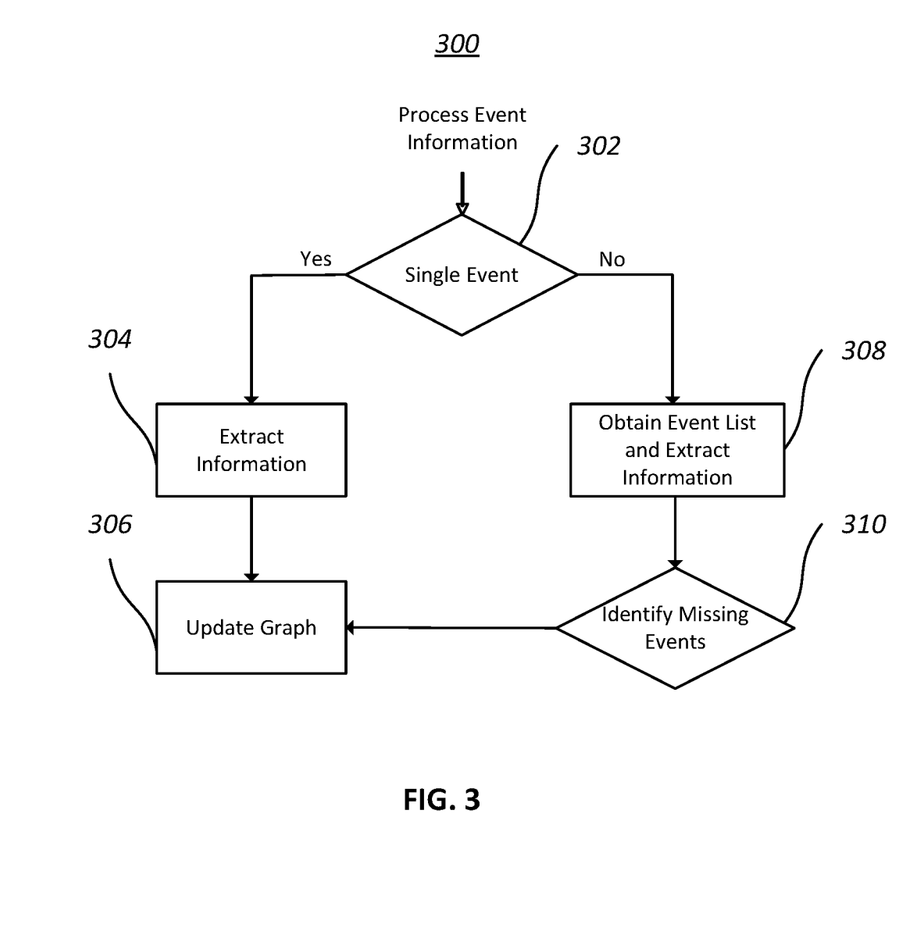
FIG. 3 illustrates an example flow diagram for processing of process states, in accordance with various embodiments of the disclosure.

The stream processor 112 may utilize process event information differently based on the event type of the process event information. FIG. 3 illustrates an example flow diagram 300 for processing process event information. The stream processor 112 may determine whether the process event information contains information for a single event or multiple events (block 302). Based on the process event information containing information for a single event (e.g., observation of a process creation event/process termination event, process zombie), the stream processor 112 may extract relevant information for the single event from the process event information (block 304). The stream processor 112 may update the process graph based on the extracted information about the single event (block 306). Based on the process event information containing information for multiple events (e.g., garbage collection, process scan), the stream processor 112 may obtain one or more event lists (e.g., list of active processes, list of previously active processes that are no longer active) and extract relevant information for the multiple events (block 308). The stream processor 112 may separate the multiple events and process them as the stream processor 112 processes single events.

The stream processor 112 may use process event information obtained at different times to identity missing process start events and/or missing process termination events. For example, the steam processor 112 may compare snapshots of active processes obtained at different times to identify started/terminated processes which were not observed (e.g., in real-time) (block 310). The stream processor 112 may extract relevant information for the missing events and update the process graph based on the extracted information about the missing events (block 306). Such use of process event information obtained at different times may enable the stream processor 112 to update the process graphs with information regarding process events for which messages may have been lost (e.g., due to network issues, agent issues). For example, when stream processor 112 receives a list of active processes on a computing device from a process scan, the stream processor 112 may add terminations times to processes which are listed in the active process list and not found during the process scan as being active. As another example, when stream processor 112 receives a list of active processes on a computing device from a process scan, the stream processor 112 may add start times to processes which are found in the process scan and not found in the active process list. Other updates to the process graph based on identification of missing events are contemplated.

The exact time of missing process events (e.g., times at which a process started/terminated) may not be recoverable from process event information obtained at different times (e.g., comparison of snapshots/comparison of snapshots to active process lists). The error in timing of process events (e.g., start/termination events) may be bounded by the snapshot interval (e.g., garbage interval, scan interval). In some embodiments, the recovered process states/events may be assigned the time of the snapshot at which the particular states/events were recovered. The recovered process states/events may be assigned other times (e.g., time of the last snapshot at which the prior state/event is identified, the time between two snapshots at which different states are identified).

The stream processor 112 may store the graph information and/or other information within the graph database 114. The graph information may be stored within a single table or multiple tables within the graph database 114. The table(s) may store information relating to process relationships, metadata, and/or other information relating to processes/process events. For example, for individual processes, the table(s) may store two edges: an edge from parent process to child process and an edge from child process to parent process. Other metadata relating to the processes may be stored within the table(s). In some embodiments, relationship information relating to the processes may be stored separately from other metadata relating to the processes.

In some embodiments, the graph information may be stored within the graph database using a key-value database structure (e.g., NoSQL database) and/or other structures. For example, the graph information may be stored using Apache HBase and/or other non-relational, distributed database. A key-value based storage may support the graph information/process graph and their properties. Using a key-value database structure may enable storage of information regarding numerous (e.g., billions) events as well as support queries regarding relationships and properties of the events in real-time. Using a key-value database structure may provide horizontal scaling and higher availability in providing for storage and retrieval of data. In some embodiments, a key-value database structure may be column-based, enabling storage within as many columns as needed, and may allow storage/usage of the graph information without a defined schema. The column-based nature of the graph database 114 may enable support of dynamic properties. The key-value structure of the graph database 114 may provide for enhanced search performance. A key-value database may support directed and undirected graph, and may enable queries regarding one or more nodes, edges, and/or portions of the process graph (support edge, vertex, sub-graph queries). Distributed nature of the database may provide scalability for the graph database 114. One or more layers may be built on top of the graph database 114 to support operations on process graphs. Use of other database models are contemplated.

The query server 116 may obtain one or more queries regarding one or more processes of a computing device. The query server 116 may receive queries from a user and/or a computing device. The query server 116 may be configured to determine one or more responses to the quer(ies) based on the graph information within the graph database 114. The response(s) may include/utilize one or more nodes, edges, and/or sub-graphs of process graphs stored within the graph database 114. The query server 116 may explain and/or provide a process graph stored within the graph database 114. For example, a query may identify an identifier of a process (P), a particular step length (S), and a selection of a parent or a child option. For the child option, the query server 116 may return a subgraph of the process graph with the process (P) as the root and all children of the process (P) within S steps. For parent option, the query server 116 may return a subgraph of the process graph with the ancestors of the process (P) in S steps. As another example, a query may identify a time range for a particular computing device, and the query server 116 may return processes of the process graph that were alive within the particular computing device during the time range. Other types of queries and responses based on the graph information are contemplated.

Figure 4:
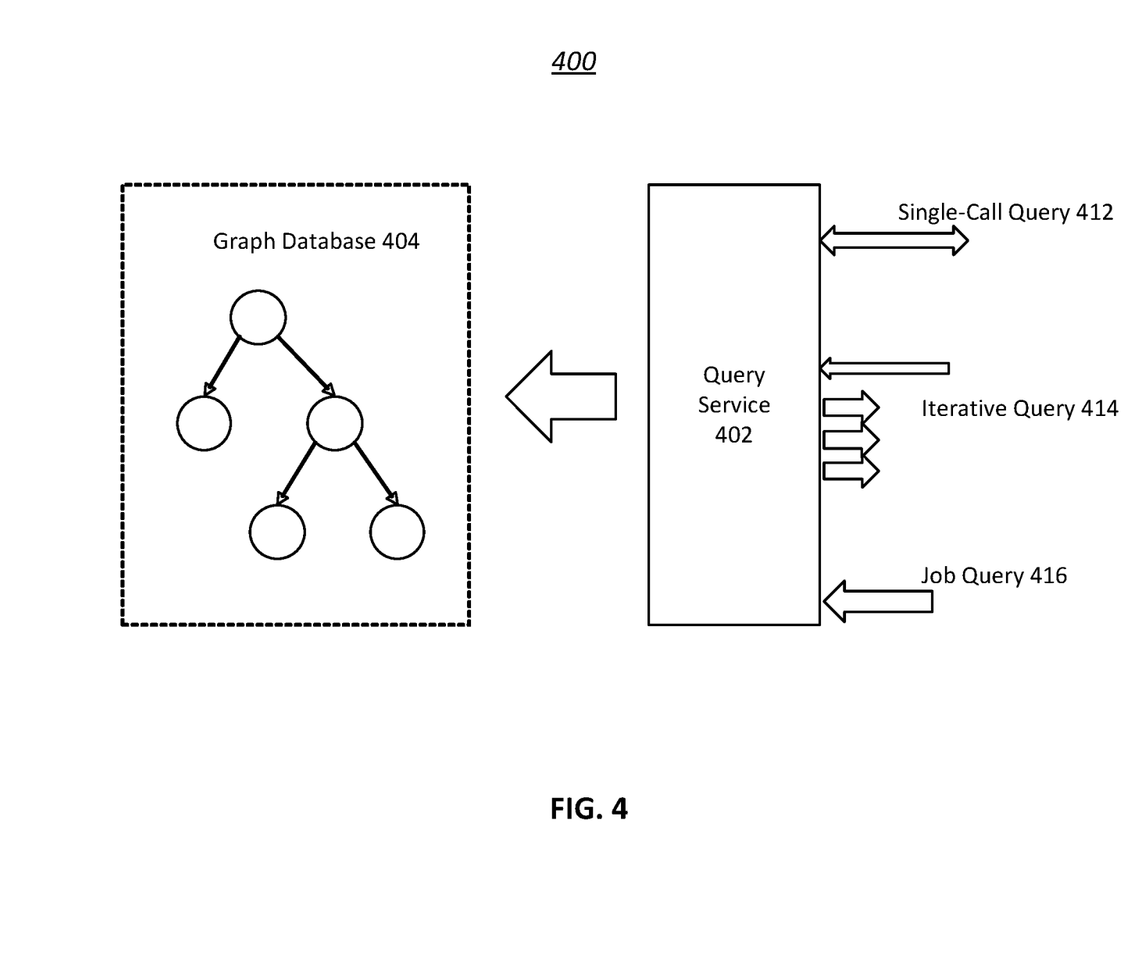
FIG. 4 illustrates an example diagram of receiving and responding to queries regarding a process, in accordance with various embodiments of the disclosure.

In some embodiments, the query server 116 may provide one or more sets of application programming interfaces from which the query server 116 may obtain and respond to a query. The application programming interfaces may support node, vertex, edge, and/or sub-graph queries. The set(s) of application programming interfaces may include a single-call application programming interface, an iterative application programming interface, and a batch-processing application programming interface. FIG. 4 illustrates an example diagram 400 showing different ways in which queries regarding a process may be received and responded. A single-call query 412 may include a request for information about a particular aspect of a process/relationship between processes. For example, the single-call query 412 may request information on properties of a process and the properties may be returned in response to the query based on the graph database 404. A single-call query 412 may be used to find a small-sized sub-graph or a part of a sub-graph in a single call. An iterative query 414 may include a request where the response cannot be returned in a single result. For example, the process graph in the graph database 404 may be large and may need to be processed in multiple steps to return the response. In response to the iterative query 414, the query server 116 may return the response in multiple parts. An iterative query 414 may be used to find a big sub-graph in multiple calls. A job query 416 may include a request that may consume a large amount of resources. For example, a job query 416 may include a request to process an entire process graph within the graph database 404. Determining a response to a job query 416 may take a lot of time/processing/memory, and the response may not be returned in real time. Instead, such response may be determined offline/when resources are (more) available. For example, a job query 416 may use a batch-processing framework and may be used to read and process an entire graph as an offline batch job.

Figure 5:
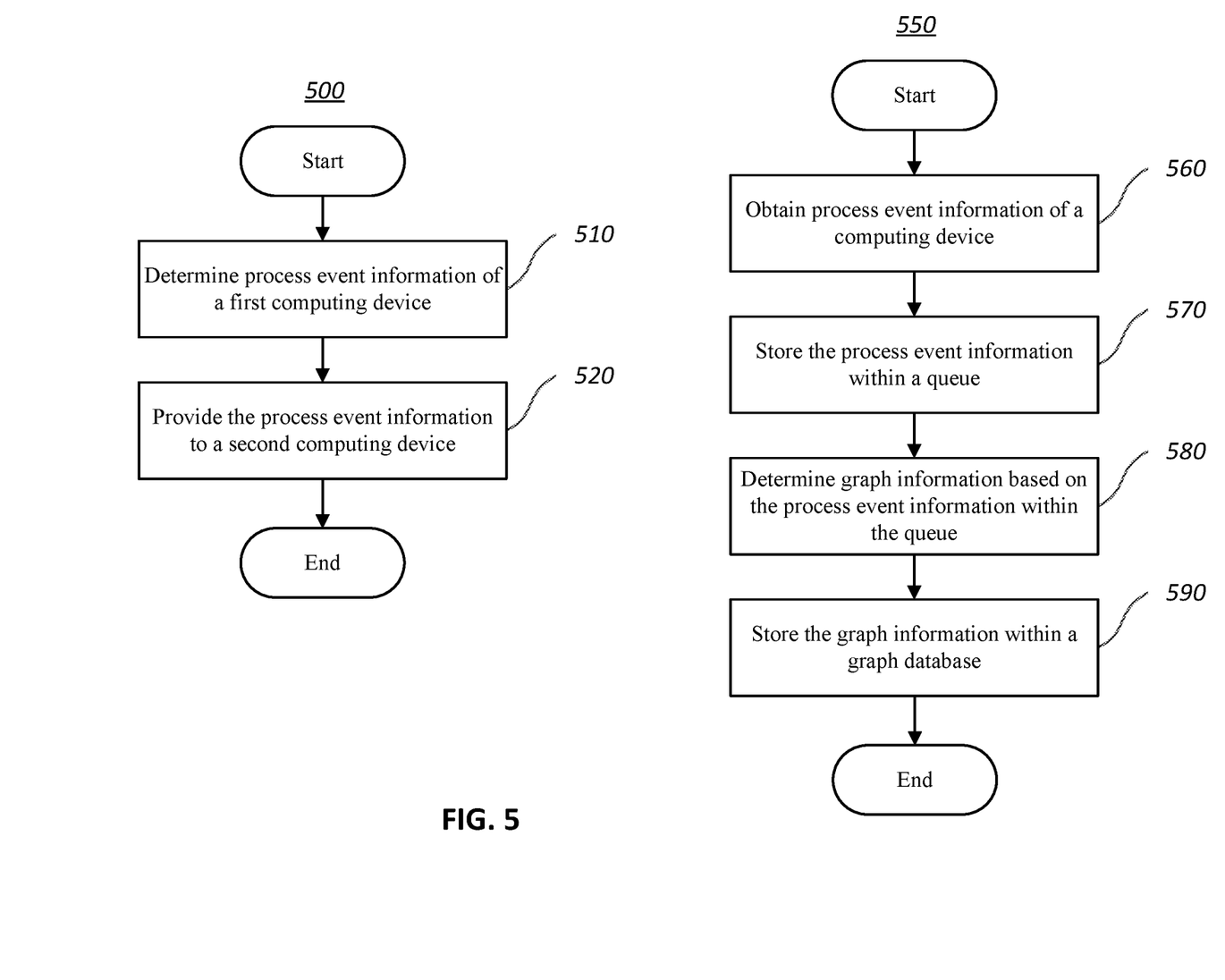
FIG. 5 illustrates flow charts of example methods, in accordance with various embodiments of the disclosure.

FIG. 5 illustrates flowcharts of example methods 500, 550, according to various embodiments of the present disclosure. The methods 500, 550 may be implemented in various environments including, for example, the environment 100 of FIG. 1. The operations of methods 500, 550 presented below are intended to be illustrative. Depending on the implementation, the methods 500, 550 may include additional, fewer, or alternative steps performed in various orders or in parallel. The methods 500, 550 may be implemented in various computing systems or devices including one or more processors.

With respect to the method 500, at block 510, process event information of a first computing device may be determined. At block 520, the process event information may be provided to a second computing device.

With respect to the method 550, at block 560, process event information of a computing device may be obtained. At block 570, the process event information may be stored within a queue. At block 580, graph information may be determined based on the process event information within the queue. At block 590, the graph information may be stored within a graph database.

Figure 6:
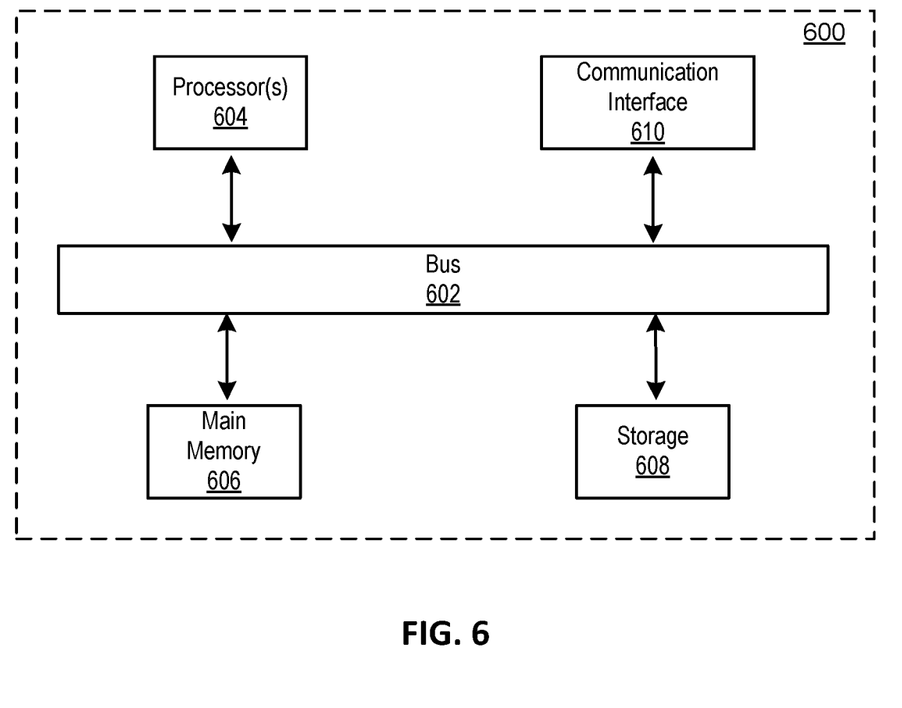
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein. In alternative embodiments, hardwired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A system for processing process states, the system comprising:
   one or more processors; and
   a memory storing instructions that, when executed by the one or more processors, cause the system to perform:
      obtaining process event information of a computing device, the process event information characterizing states of processes of the computing device;
      storing the process event information within a queue;
      determining graph information based on the process event information within the queue, the process event information including a respective unique process identifier for each of the processes of the computing device, each of the respective unique process identifiers being based on a combination of a respective reusable process identifier and a respective process start time, the graph information characterizing states of processes of the computing device using nodes and edges, each node of the graph information representing a respective process of the processes of the computing device, and each edge of the graph information representing a respective relationship between two or more processes of the processes of the computing device;
      determining, based on the respective edges of the graph information and the respective unique process identifiers based on the combination of the respective reusable process identifiers and the respective process start times, an order of any of the processes of the computing device or process events associated with the process event information; and
      storing the graph information within a graph database.

2. The system of claim 1, wherein the process event information is obtained from a process state collector agent running on the computing device.

3. The system of claim 2, wherein the process event information is obtained and stored within the queue by an event receiver server of the system.

4. The system of claim 3, wherein the queue is a distributed buffer storage.

5. The system of claim 3, wherein the graph information is determined by a stream processor of the system and the stream processor is, to determine the graph information, configured to identify and order process events based on the process event information within the queue.

6. The system of claim 5, wherein the graph information includes parent-child relationships and properties of the processes of the computing device.

7. The system of claim 5, wherein the stream processor uses process event information obtained at different times to identity missing process start events or missing process termination events.

8. The system of claim 1, wherein the graph information is stored within the graph database using a key-value database structure.

9. The system of claim 1, wherein the instructions further cause the system to perform:
   obtaining a query regarding a given process of the computing device; and
   determining a response to the query based on the graph information within the graph database.

10. The system of claim 9, wherein the query is obtained and responded to by a query server of the system.

11. The system of claim 10, wherein the query server provides a set of application programming interfaces to obtain and respond to the query, the set of application programming interfaces including a single-call application programming interface, an iterative application programming interface, and a batch-processing application programming interface.

12. A method for processing process states, the method implemented by a computing system including one or more processors and non-transitory storage media storing machine-readable instructions, the method comprising:
   obtaining process event information of a computing device, the process event information characterizing states of processes of the computing device;
   storing the process event information within a queue;
   determining graph information based on the process event information within the queue, the process event information including a respective unique process identifier for each of the processes of the computing device, each of the respective unique process identifiers being based on a combination of a respective reusable process identifier and a respective process start time, the graph information characterizing states of processes of the computing device using nodes and edges, each node of the graph information representing a respective process of the processes of the computing device, and each edge of the graph information representing a respective relationship between two or more processes of the processes of the computing device;
   determining, based on the respective edges of the graph information and the respective unique process identifiers based on the combination of the respective reusable process identifiers and the respective process start times, an order of any of the processes of the computing device or process events associated with the process event information; and storing the graph information within a graph database.

13. The method of claim 12, wherein the process event information is obtained from a process state collector agent running on the computing device.

14. The method of claim 13, wherein the process event information is obtained and stored within the queue by an event receiver server of the computing system.

15. The method of claim 14, wherein the queue is a distributed buffer storage.

16. The method of claim 14, wherein the graph information is determined by a stream processor of the computing system and the stream processor is, to determine the graph information, configured to identify and order process events based on the process event information within the queue.

17. The method of claim 16, wherein the graph information includes parent-child relationships and properties of the processes of the computing device.

18. The method of claim 16, wherein the stream processor uses process event information obtained at different times to identity missing process start events or missing process termination events.

19. The method of claim 12, wherein the graph information is stored within the graph database using a key-value database structure.

20. The method of claim 12, further comprising:

obtaining a query regarding a given process of the computing device; and determining a response to the query based on the graph information within the graph database.

21. The method of claim 20, wherein the query is obtained and responded to by a query server of the computing system.

22. The method of claim 21, wherein the query server provides a set of application programming interfaces to obtain and respond to the query, the set of application programming interfaces including a single-call application programming interface, an iterative application programming interface, and a batch-processing application programming interface.

* * * * *